(12) United States Patent
Thirumalai et al.

(10) Patent No.: US 8,336,085 B2
(45) Date of Patent: Dec. 18, 2012

(54) TUNING PRODUCT POLICY USING OBSERVED EVIDENCE OF CUSTOMER BEHAVIOR

(75) Inventors: Gokul P. Thirumalai, Bellevue, WA (US); Isaac Ahdout, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 1050 days.

(21) Appl. No.: 11/224,635

(22) Filed: Sep. 12, 2005

(65) Prior Publication Data

US 2006/0107306 A1 May 18, 2006

Related U.S. Application Data

(63) Continuation-in-part of application No. 11/152,214, filed on Jun. 14, 2005, which is a continuation-in-part of application No. 11/022,493, filed on Dec. 22, 2004, which is a continuation-in-part of application No. 11/006,837, filed on Dec. 8, 2004, which is a continuation-in-part of application No. 10/989,122, filed on Nov. 15, 2004.

(51) Int. Cl.
G06F 21/00 (2006.01)
(52) U.S. Cl. ............... 726/5; 726/26; 726/27; 705/17
(58) Field of Classification Search ............ 705/17; 726/5, 26, 27
See application file for complete search history.

(56) References Cited

U.S. PATENT DOCUMENTS

| | | | |
|---|---|---|---|
| 4,558,176 A | 12/1985 | Arnold et al. | |
| 4,620,150 A | 10/1986 | Germer et al. | |
| 4,750,034 A | 6/1988 | Lem | |
| 4,817,094 A | 3/1989 | Lebizay et al. | |
| 4,855,730 A | 8/1989 | Venners et al. | |
| 4,855,922 A | 8/1989 | Huddleston et al. | |
| 4,857,999 A | 8/1989 | Welsh | |
| 4,910,692 A | 3/1990 | Outram | |
| 4,959,774 A | 9/1990 | Davis | |
| 4,967,273 A | 10/1990 | Greenberg | |
| 5,001,752 A | 3/1991 | Fischer | |
| 5,012,514 A | 4/1991 | Renton | |
| 5,249,184 A | 9/1993 | Woest et al. | |
| 5,269,019 A | 12/1993 | Peterson et al. | |
| 5,274,368 A | 12/1993 | Breeden et al. | |

(Continued)

FOREIGN PATENT DOCUMENTS

CN 1531673 9/2004

(Continued)

OTHER PUBLICATIONS

Morales, Tatiana, "Understanding your Credit Score", Apr. 30, 2003. http://www.cbsnews.com/stories/2003/04/29/earlyshow/contributors/raymartin/main551521.shtml.*

(Continued)

*Primary Examiner* — Farid Homayounmehr
*Assistant Examiner* — Lisa Lewis

(57) ABSTRACT

A computer adapted for pay-as-you go or other metered use has a policy for determined what measurements to take to detect fraud as well as steps to take when fraud is found. To optimize between good performance and sufficient tests to reduce the risk of fraud, a policy is developed based on observation of the users behavior, using data taken at the computer, data from a payment processor or both. After analysis, an updated policy is securely loaded at the computer to determine what, and how often to measure for suspected fraud.

20 Claims, 4 Drawing Sheets

U.S. PATENT DOCUMENTS

| | | | |
|---|---|---|---|
| 5,301,268 | A | 4/1994 | Takeda |
| 5,355,161 | A | 10/1994 | Bird et al. |
| 5,369,262 | A | 11/1994 | Dvorkis et al. |
| 5,406,630 | A | 4/1995 | Piosenka et al. |
| 5,414,861 | A | 5/1995 | Horning |
| 5,437,040 | A | 7/1995 | Campbell |
| 5,442,704 | A | 8/1995 | Holtey |
| 5,448,045 | A | 9/1995 | Clark |
| 5,459,867 | A | 10/1995 | Adams et al. |
| 5,473,692 | A | 12/1995 | Davis |
| 5,490,216 | A | 2/1996 | Richardson, III |
| 5,500,897 | A | 3/1996 | Hartman, Jr. |
| 5,513,319 | A | 4/1996 | Finch et al. |
| 5,522,040 | A | 5/1996 | Hofsass et al. |
| 5,530,846 | A | 6/1996 | Strong |
| 5,552,776 | A | 9/1996 | Wade et al. |
| 5,563,799 | A | 10/1996 | Brehmer et al. |
| 5,568,552 | A | 10/1996 | Davis |
| 5,586,291 | A | 12/1996 | Lasker et al. |
| 5,671,412 | A | 9/1997 | Christiano |
| 5,710,706 | A | 1/1998 | Markl et al. |
| 5,715,403 | A | 2/1998 | Stefik |
| 5,724,425 | A | 3/1998 | Chang et al. |
| 5,745,879 | A | 4/1998 | Wyman |
| 5,754,763 | A | 5/1998 | Bereiter |
| 5,758,068 | A | 5/1998 | Brandt et al. |
| 5,763,832 | A | 6/1998 | Anselm |
| 5,768,382 | A | 6/1998 | Schneier et al. |
| 5,771,354 | A | 6/1998 | Crawford |
| 5,774,870 | A | 6/1998 | Storey |
| 5,793,839 | A * | 8/1998 | Farris et al. ................ 379/32.03 |
| 5,802,592 | A | 9/1998 | Chess |
| 5,825,883 | A | 10/1998 | Archibald et al. |
| 5,841,865 | A | 11/1998 | Sudia |
| 5,844,986 | A | 12/1998 | Davis |
| 5,845,065 | A | 12/1998 | Conte et al. |
| 5,875,236 | A | 2/1999 | Jankowitz et al. |
| 5,883,670 | A | 3/1999 | Sporer et al. |
| 5,892,906 | A | 4/1999 | Chou et al. |
| 5,925,127 | A | 7/1999 | Ahmad |
| 5,948,061 | A | 9/1999 | Merriman |
| 5,953,502 | A | 9/1999 | Helbig |
| 5,956,408 | A | 9/1999 | Arnold |
| 5,983,238 | A | 11/1999 | Becker et al. |
| 5,994,710 | A | 11/1999 | Knee et al. |
| 6,021,438 | A | 2/2000 | Duvvoori et al. |
| 6,026,293 | A | 2/2000 | Osborn |
| 6,049,789 | A | 4/2000 | Frison et al. |
| 6,061,794 | A | 5/2000 | Angelo et al. |
| 6,078,909 | A | 6/2000 | Knutson |
| 6,101,606 | A | 8/2000 | Diersch et al. |
| 6,119,229 | A | 9/2000 | Martinez et al. |
| 6,147,773 | A | 11/2000 | Taylor |
| 6,148,417 | A | 11/2000 | Da Silva |
| 6,158,657 | A | 12/2000 | Hall, III et al. |
| 6,185,678 | B1 | 2/2001 | Arbaugh et al. |
| 6,188,995 | B1 | 2/2001 | Garst et al. |
| 6,189,146 | B1 | 2/2001 | Misra et al. |
| 6,192,392 | B1 | 2/2001 | Ginter |
| 6,219,652 | B1 | 4/2001 | Carter et al. |
| 6,223,291 | B1 | 4/2001 | Puhl |
| 6,226,747 | B1 | 5/2001 | Larsson et al. |
| 6,230,185 | B1 | 5/2001 | Salas et al. |
| 6,233,600 | B1 | 5/2001 | Salas et al. |
| 6,233,685 | B1 | 5/2001 | Smith |
| 6,243,439 | B1 | 6/2001 | Arai et al. |
| 6,253,224 | B1 | 6/2001 | Brice, Jr. et al. |
| 6,263,431 | B1 | 7/2001 | Lovelace et al. |
| 6,272,469 | B1 | 8/2001 | Koritzinsky et al. |
| 6,279,111 | B1 | 8/2001 | Jensenworth et al. |
| 6,279,156 | B1 | 8/2001 | Amberg et al. |
| 6,286,051 | B1 | 9/2001 | Becker et al. |
| 6,289,319 | B1 | 9/2001 | Lockwood |
| 6,295,577 | B1 | 9/2001 | Anderson et al. |
| 6,303,924 | B1 | 10/2001 | Adan et al. |
| 6,314,408 | B1 | 11/2001 | Salas et al. |
| 6,314,409 | B2 | 11/2001 | Schneck et al. |
| 6,321,335 | B1 | 11/2001 | Chu |
| 6,327,652 | B1 | 12/2001 | England et al. |
| 6,330,670 | B1 | 12/2001 | England et al. |
| 6,334,189 | B1 | 12/2001 | Granger et al. |
| 6,345,294 | B1 | 2/2002 | O'Toole et al. |
| 6,363,488 | B1 | 3/2002 | Ginter et al. |
| 6,367,017 | B1 | 4/2002 | Gray |
| 6,373,047 | B1 | 4/2002 | Adan et al. |
| 6,385,727 | B1 | 5/2002 | Cassagnol et al. |
| 6,405,923 | B1 | 6/2002 | Seysen |
| 6,408,170 | B1 | 6/2002 | Schmidt et al. |
| 6,411,941 | B1 | 6/2002 | Mullor et al. |
| 6,424,714 | B1 | 7/2002 | Wasilewski et al. |
| 6,441,813 | B1 | 8/2002 | Ishibashi |
| 6,442,529 | B1 | 8/2002 | Krishan et al. |
| 6,442,690 | B1 | 8/2002 | Howard, Jr. et al. |
| 6,460,140 | B1 | 10/2002 | Schoch et al. |
| 6,463,534 | B1 | 10/2002 | Geiger et al. |
| 6,496,858 | B1 | 12/2002 | Frailong et al. |
| 6,567,793 | B1 | 5/2003 | Hicks et al. |
| 6,571,216 | B1 | 5/2003 | Garg et al. |
| 6,585,158 | B2 | 7/2003 | Norskog |
| 6,587,684 | B1 | 7/2003 | Hsu et al. |
| 6,609,201 | B1 | 8/2003 | Folmsbee |
| 6,625,729 | B1 | 9/2003 | Angelo |
| 6,631,478 | B1 | 10/2003 | Wang et al. |
| 6,664,948 | B2 | 12/2003 | Crane et al. |
| 6,671,803 | B1 | 12/2003 | Pasieka |
| 6,678,828 | B1 | 1/2004 | Pham et al. |
| 6,690,556 | B2 | 2/2004 | Smola et al. |
| 6,694,000 | B2 | 2/2004 | Ung et al. |
| 6,704,873 | B1 | 3/2004 | Underwood |
| 6,708,176 | B2 | 3/2004 | Strunk et al. |
| 6,711,263 | B1 | 3/2004 | Nordenstam et al. |
| 6,716,652 | B1 | 4/2004 | Ortlieb et al. |
| 6,738,810 | B1 | 5/2004 | Kramer et al. |
| 6,763,458 | B1 | 7/2004 | Watanabe |
| 6,765,470 | B2 | 7/2004 | Shinzaki |
| 6,791,157 | B1 | 9/2004 | Casto et al. |
| 6,816,809 | B2 * | 11/2004 | Circenis ........................ 702/178 |
| 6,816,900 | B1 | 11/2004 | Vogel et al. |
| 6,834,352 | B2 | 12/2004 | Shin |
| 6,839,841 | B1 | 1/2005 | Medvinsky et al. |
| 6,844,871 | B1 | 1/2005 | Hinckley et al. |
| 6,847,942 | B1 | 1/2005 | Land et al. |
| 6,851,051 | B1 | 2/2005 | Bolle et al. |
| 6,868,433 | B1 | 3/2005 | Philyaw |
| 6,871,283 | B1 | 3/2005 | Zurko et al. |
| 6,920,567 | B1 | 7/2005 | Doherty et al. |
| 6,934,692 | B1 | 8/2005 | Duncan |
| 6,934,942 | B1 | 8/2005 | Chilimbi |
| 6,954,728 | B1 | 10/2005 | Kusumoto et al. |
| 6,957,186 | B1 | 10/2005 | Guheen et al. |
| 6,976,162 | B1 | 12/2005 | Ellison et al. |
| 6,983,050 | B1 | 1/2006 | Yacobi et al. |
| 6,986,042 | B2 | 1/2006 | Griffin |
| 6,990,174 | B2 | 1/2006 | Eskelinen |
| 6,993,648 | B2 | 1/2006 | Goodman et al. |
| 7,000,100 | B2 | 2/2006 | Lacombe et al. |
| 7,000,829 | B1 | 2/2006 | Harris et al. |
| 7,013,384 | B2 | 3/2006 | Challener et al. |
| 7,028,149 | B2 | 4/2006 | Grawrock et al. |
| 7,052,530 | B2 | 5/2006 | Edlund et al. |
| 7,054,468 | B2 | 5/2006 | Yang |
| 7,069,442 | B2 | 6/2006 | Sutton, II et al. |
| 7,069,595 | B2 | 6/2006 | Cognigni et al. |
| 7,076,652 | B2 | 7/2006 | Ginter et al. |
| 7,096,469 | B1 | 8/2006 | Kubala et al. |
| 7,097,357 | B2 | 8/2006 | Johnson et al. |
| 7,103,574 | B1 | 9/2006 | Peinado et al. |
| 7,113,912 | B2 | 9/2006 | Stefik |
| 7,117,183 | B2 | 10/2006 | Blair et al. |
| 7,121,460 | B1 | 10/2006 | Parsons et al. |
| 7,127,579 | B2 | 10/2006 | Zimmer |
| 7,130,951 | B1 | 10/2006 | Christie et al. |
| 7,143,297 | B2 | 11/2006 | Buchheit et al. |
| 7,162,645 | B2 | 1/2007 | Iguchi et al. |
| 7,171,539 | B2 | 1/2007 | Mansell et al. |
| 7,174,457 | B1 | 2/2007 | England et al. |
| 7,207,039 | B2 | 4/2007 | Komarla et al. |

| Patent/Pub No. | Date | Inventor |
|---|---|---|
| 7,234,144 B2 | 6/2007 | Wilt et al. |
| 7,236,455 B1 | 6/2007 | Proudler et al. |
| 7,266,569 B2 | 9/2007 | Cutter et al. |
| 7,299,358 B2 | 11/2007 | Chateau et al. |
| 7,353,402 B2 | 4/2008 | Bourne et al. |
| 7,356,709 B2 | 4/2008 | Gunyakti et al. |
| 7,359,807 B2 | 4/2008 | Frank et al. |
| 7,360,253 B2 | 4/2008 | Frank et al. |
| 7,392,429 B2 | 6/2008 | Westerinen et al. |
| 7,395,245 B2 | 7/2008 | Okamoto et al. |
| 7,395,452 B2 | 7/2008 | Nicholson et al. |
| 7,406,446 B2 | 7/2008 | Frank et al. |
| 7,421,413 B2 | 9/2008 | Frank et al. |
| 7,441,121 B2 | 10/2008 | Cutter, Jr. et al. |
| 7,441,246 B2 | 10/2008 | Auerbach et al. |
| 7,461,249 B1 | 12/2008 | Pearson et al. |
| 7,464,103 B2 | 12/2008 | Siu et al. |
| 7,490,356 B2 | 2/2009 | Lieblich et al. |
| 7,493,487 B2 | 2/2009 | Phillips et al. |
| 7,494,277 B2 | 2/2009 | Setala |
| 7,519,816 B2 | 4/2009 | Phillips et al. |
| 7,539,863 B2 | 5/2009 | Phillips |
| 7,540,024 B2 | 5/2009 | Phillips et al. |
| 7,549,060 B2 | 6/2009 | Bourne et al. |
| 7,562,220 B2 | 7/2009 | Frank et al. |
| 7,565,325 B2 | 7/2009 | Lenard |
| 7,568,096 B2 | 7/2009 | Evans |
| 7,596,784 B2 | 9/2009 | Abrams |
| 7,610,631 B2 | 10/2009 | Frank et al. |
| 7,644,239 B2 | 1/2010 | Westerinen et al. |
| 7,669,056 B2 | 2/2010 | Frank |
| 7,694,153 B2 | 4/2010 | Ahdout et al. |
| 7,770,205 B2 | 8/2010 | Frank |
| 7,814,532 B2 | 10/2010 | Cromer et al. |
| 7,877,607 B2 | 1/2011 | Circenis |
| 7,669,056 C1 | 2/2011 | Frank et al. |
| 7,891,007 B2 | 2/2011 | Waxman et al. |
| 7,958,029 B1 * | 6/2011 | Bobich et al. .................. 705/35 |
| 7,979,721 B2 | 7/2011 | Westerinen et al. |
| 2001/0034711 A1 | 10/2001 | Tashenberg |
| 2001/0056413 A1 | 12/2001 | Suzuki et al. |
| 2001/0056539 A1 | 12/2001 | Pavlin et al. |
| 2002/0002597 A1 | 1/2002 | Morrell, Jr. |
| 2002/0007310 A1 | 1/2002 | Long |
| 2002/0023212 A1 | 2/2002 | Proudler |
| 2002/0046098 A1 | 4/2002 | Maggio |
| 2002/0055906 A1 * | 5/2002 | Katz et al. ..................... 705/39 |
| 2002/0091569 A1 | 7/2002 | Kitaura et al. |
| 2002/0107701 A1 | 8/2002 | Batty et al. |
| 2002/0111916 A1 | 8/2002 | Coronna et al. |
| 2002/0112171 A1 | 8/2002 | Ginter et al. |
| 2002/0123964 A1 | 9/2002 | Kramer et al. |
| 2002/0124212 A1 | 9/2002 | Nitschke et al. |
| 2002/0129359 A1 | 9/2002 | Lichner |
| 2002/0138549 A1 | 9/2002 | Urien |
| 2002/0141451 A1 | 10/2002 | Gates et al. |
| 2002/0144131 A1 | 10/2002 | Spacey |
| 2002/0147601 A1 | 10/2002 | Fagan |
| 2002/0147782 A1 | 10/2002 | Dimitrova et al. |
| 2002/0147912 A1 | 10/2002 | Shmueli et al. |
| 2002/0178071 A1 | 11/2002 | Walker et al. |
| 2002/0184482 A1 | 12/2002 | Lacombe et al. |
| 2002/0184508 A1 | 12/2002 | Bialick et al. |
| 2002/0193101 A1 | 12/2002 | McAlinden |
| 2002/0194132 A1 | 12/2002 | Pearson et al. |
| 2003/0005135 A1 | 1/2003 | Inoue et al. |
| 2003/0014323 A1 * | 1/2003 | Scheer ........................ 705/26 |
| 2003/0027549 A1 | 2/2003 | Kiel et al. |
| 2003/0028454 A1 | 2/2003 | Ooho et al. |
| 2003/0035409 A1 | 2/2003 | Wang et al. |
| 2003/0037246 A1 | 2/2003 | Goodman et al. |
| 2003/0040960 A1 | 2/2003 | Eckmann |
| 2003/0046026 A1 | 3/2003 | Levy et al. |
| 2003/0048473 A1 | 3/2003 | Rosen |
| 2003/0056107 A1 | 3/2003 | Cammack et al. |
| 2003/0084104 A1 | 5/2003 | Salem et al. |
| 2003/0084278 A1 | 5/2003 | Cromer et al. |
| 2003/0084285 A1 | 5/2003 | Cromer et al. |
| 2003/0084337 A1 | 5/2003 | Simionescu et al. |
| 2003/0084352 A1 | 5/2003 | Schwartz et al. |
| 2003/0088500 A1 | 5/2003 | Shinohara et al. |
| 2003/0093694 A1 | 5/2003 | Medvinsky et al. |
| 2003/0097596 A1 | 5/2003 | Muratov et al. |
| 2003/0110388 A1 | 6/2003 | Pavlin et al. |
| 2003/0115458 A1 | 6/2003 | Song |
| 2003/0126519 A1 | 7/2003 | Odorcic |
| 2003/0131252 A1 | 7/2003 | Barton |
| 2003/0135380 A1 * | 7/2003 | Lehr et al. ..................... 705/1 |
| 2003/0149671 A1 | 8/2003 | Yamamoto et al. |
| 2003/0156572 A1 | 8/2003 | Hui et al. |
| 2003/0156719 A1 | 8/2003 | Cronce |
| 2003/0163383 A1 | 8/2003 | Engelhart |
| 2003/0163712 A1 | 8/2003 | LaMothe et al. |
| 2003/0172376 A1 | 9/2003 | Coffin, III et al. |
| 2003/0185395 A1 | 10/2003 | Lee et al. |
| 2003/0188165 A1 | 10/2003 | Sutton et al. |
| 2003/0196102 A1 | 10/2003 | McCarroll |
| 2003/0196106 A1 | 10/2003 | Erfani et al. |
| 2003/0208338 A1 | 11/2003 | Challener et al. |
| 2003/0208573 A1 | 11/2003 | Harrison et al. |
| 2003/0229702 A1 | 12/2003 | Hensbergen et al. |
| 2004/0001088 A1 | 1/2004 | Stancil et al. |
| 2004/0003190 A1 | 1/2004 | Childs et al. |
| 2004/0003288 A1 | 1/2004 | Wiseman et al. |
| 2004/0010440 A1 | 1/2004 | Lenard et al. |
| 2004/0019456 A1 | 1/2004 | Cirenis |
| 2004/0023636 A1 | 2/2004 | Gurel et al. |
| 2004/0030912 A1 | 2/2004 | Merkle, Jr. et al. |
| 2004/0034816 A1 | 2/2004 | Richard |
| 2004/0039916 A1 | 2/2004 | Aldis et al. |
| 2004/0039924 A1 | 2/2004 | Baldwin et al. |
| 2004/0039960 A1 | 2/2004 | Kassayan |
| 2004/0044629 A1 | 3/2004 | Rhodes et al. |
| 2004/0054907 A1 | 3/2004 | Chateau et al. |
| 2004/0054908 A1 | 3/2004 | Circenis et al. |
| 2004/0054909 A1 | 3/2004 | Serkowski et al. |
| 2004/0059937 A1 | 3/2004 | Nakano |
| 2004/0064707 A1 | 4/2004 | McCann et al. |
| 2004/0067746 A1 | 4/2004 | Johnson |
| 2004/0073670 A1 | 4/2004 | Chack et al. |
| 2004/0088548 A1 | 5/2004 | Smetters et al. |
| 2004/0093371 A1 | 5/2004 | Burrows et al. |
| 2004/0093508 A1 | 5/2004 | Foerstner et al. |
| 2004/0107359 A1 | 6/2004 | Kawano et al. |
| 2004/0107368 A1 | 6/2004 | Colvin |
| 2004/0123127 A1 | 6/2004 | Teicher et al. |
| 2004/0125755 A1 | 7/2004 | Roberts |
| 2004/0128251 A1 | 7/2004 | Adam et al. |
| 2004/0133794 A1 | 7/2004 | Kocher et al. |
| 2004/0139027 A1 | 7/2004 | Molaro |
| 2004/0193919 A1 | 9/2004 | Dabbish et al. |
| 2004/0199769 A1 | 10/2004 | Proudler |
| 2004/0205357 A1 | 10/2004 | Kuo et al. |
| 2004/0220858 A1 | 11/2004 | Maggio |
| 2004/0225894 A1 | 11/2004 | Colvin |
| 2004/0255000 A1 | 12/2004 | Simionescu et al. |
| 2004/0268120 A1 | 12/2004 | Mirtal et al. |
| 2005/0015343 A1 | 1/2005 | Nagai et al. |
| 2005/0021944 A1 | 1/2005 | Craft et al. |
| 2005/0028000 A1 | 2/2005 | Bulusu et al. |
| 2005/0033747 A1 | 2/2005 | Wittkotter |
| 2005/0039013 A1 | 2/2005 | Bajikar et al. |
| 2005/0044197 A1 | 2/2005 | Lai |
| 2005/0050355 A1 | 3/2005 | Graunke |
| 2005/0060388 A1 | 3/2005 | Tatsumi et al. |
| 2005/0065880 A1 | 3/2005 | Amato et al. |
| 2005/0080701 A1 * | 4/2005 | Tunney et al. .................. 705/35 |
| 2005/0091104 A1 | 4/2005 | Abraham |
| 2005/0097204 A1 | 5/2005 | Horowitz et al. |
| 2005/0102181 A1 | 5/2005 | Scroggie et al. |
| 2005/0108547 A1 | 5/2005 | Sakai |
| 2005/0108564 A1 | 5/2005 | Freeman et al. |
| 2005/0120251 A1 | 6/2005 | Fukumori |
| 2005/0125673 A1 | 6/2005 | Cheng et al. |
| 2005/0129296 A1 | 6/2005 | Setala |
| 2005/0132150 A1 | 6/2005 | Jewell et al. |
| 2005/0138370 A1 | 6/2005 | Goud et al. |
| 2005/0138389 A1 | 6/2005 | Catherman et al. |

| | | | | | |
|---|---|---|---|---|---|
| 2005/0138423 A1 | 6/2005 | Ranganathan | JP | H07141153 | 6/1995 |
| 2005/0141717 A1 | 6/2005 | Cromer et al. | JP | H086729 | 1/1996 |
| 2005/0144099 A1* | 6/2005 | Deb et al. .......... 705/35 | JP | 2001526550 | 5/1997 |
| 2005/0166051 A1 | 7/2005 | Buer | JP | H09185504 | 7/1997 |
| 2005/0182921 A1 | 8/2005 | Duncan | JP | H9251494 | 9/1997 |
| 2005/0182940 A1 | 8/2005 | Sutton | JP | 2000293369 | 10/2000 |
| 2005/0188843 A1 | 9/2005 | Edlund et al. | JP | 2001101742 | 2/2001 |
| 2005/0203801 A1 | 9/2005 | Morgenstern et al. | JP | 2003510684 | 3/2001 |
| 2005/0213761 A1 | 9/2005 | Walmsley et al. | JP | 2001101033 | 4/2001 |
| 2005/0216577 A1 | 9/2005 | Durham et al. | JP | 2003510713 | 4/2001 |
| 2005/0221766 A1 | 10/2005 | Brizek et al. | JP | 2001184472 | 7/2001 |
| 2005/0235141 A1 | 10/2005 | Ibrahim et al. | JP | 2001312325 | 11/2001 |
| 2005/0240533 A1 | 10/2005 | Cutter et al. | JP | 2001331229 | 11/2001 |
| 2005/0246521 A1 | 11/2005 | Bade et al. | JP | 2001338233 | 12/2001 |
| 2005/0246525 A1 | 11/2005 | Bade et al. | JP | 2002108478 | 4/2002 |
| 2005/0246552 A1 | 11/2005 | Bade et al. | JP | 2002108870 | 4/2002 |
| 2005/0257073 A1 | 11/2005 | Bade | JP | 2002374327 | 12/2002 |
| 2005/0275866 A1 | 12/2005 | Corlett | JP | 2003507785 | 2/2003 |
| 2005/0278519 A1 | 12/2005 | Luebke et al. | JP | 2003140761 | 5/2003 |
| 2005/0279827 A1* | 12/2005 | Mascavage et al. .......... 235/380 | JP | 2003140762 | 5/2003 |
| 2005/0286476 A1 | 12/2005 | Crosswy et al. | JP | 2003157335 | 5/2003 |
| 2005/0289177 A1 | 12/2005 | Hohmann, II et al. | JP | 2003208314 | 7/2003 |
| 2005/0289343 A1 | 12/2005 | Tahan | JP | 2003248522 | 9/2003 |
| 2006/0010326 A1 | 1/2006 | Bade et al. | JP | 2003296487 | 10/2003 |
| 2006/0015717 A1 | 1/2006 | Liu et al. | JP | 2002182562 | 1/2004 |
| 2006/0015718 A1 | 1/2006 | Liu et al. | JP | 2004062561 | 2/2004 |
| 2006/0015732 A1 | 1/2006 | Liu | JP | 2004118327 | 4/2004 |
| 2006/0020784 A1 | 1/2006 | Jonker et al. | JP | 2004164491 | 6/2004 |
| 2006/0026418 A1 | 2/2006 | Bade | JP | 2004295846 | 10/2004 |
| 2006/0026419 A1 | 2/2006 | Arndt et al. | JP | 2004304755 | 10/2004 |
| 2006/0026422 A1 | 2/2006 | Bade et al. | JP | 2007525774 | 9/2007 |
| 2006/0055506 A1 | 3/2006 | Nicolas | JP | H08-054952 | 2/2011 |
| 2006/0072748 A1 | 4/2006 | Buer | KR | 2001-805 | 1/2001 |
| 2006/0072762 A1 | 4/2006 | Buer | KR | 20010000805 | 1/2001 |
| 2006/0074600 A1 | 4/2006 | Sastry et al. | KR | 2002-37453 | 5/2002 |
| 2006/0075014 A1 | 4/2006 | Tharappel et al. | KR | 20020037453 | 5/2002 |
| 2006/0075223 A1 | 4/2006 | Bade et al. | KR | 2005-8439 | 1/2005 |
| 2006/0085634 A1 | 4/2006 | Jain et al. | KR | 20050008439 | 1/2005 |
| 2006/0085637 A1 | 4/2006 | Pinkas | KR | 2005-21782 | 3/2005 |
| 2006/0085844 A1 | 4/2006 | Buer et al. | KR | 20050021782 | 3/2005 |
| 2006/0089917 A1 | 4/2006 | Strom et al. | WO | WO-9721162 | 6/1997 |
| 2006/0090084 A1 | 4/2006 | Buer | WO | WO-9811478 | 3/1998 |
| 2006/0100010 A1 | 5/2006 | Gatto et al. | WO | WO-0054126 | 9/2000 |
| 2006/0106845 A1 | 5/2006 | Frank et al. | WO | WO-01/35293 | 5/2001 |
| 2006/0106920 A1 | 5/2006 | Steeb et al. | WO | WO-01/45012 | 6/2001 |
| 2006/0107306 A1 | 5/2006 | Thirumalai et al. | WO | WO-0163512 | 8/2001 |
| 2006/0107328 A1 | 5/2006 | Frank et al. | WO | WO-0177795 | 10/2001 |
| 2006/0107335 A1 | 5/2006 | Frank et al. | WO | WO-0193461 | 12/2001 |
| 2006/0112267 A1 | 5/2006 | Zimmer et al. | WO | WO-0208969 | 1/2002 |
| 2006/0117177 A1 | 6/2006 | Buer | WO | WO-02056155 | 7/2002 |
| 2006/0129824 A1 | 6/2006 | Hoff et al. | WO | WO-02103495 | 12/2002 |
| 2006/0130130 A1 | 6/2006 | Kablotsky | WO | WO-03009115 | 1/2003 |
| 2006/0143431 A1 | 6/2006 | Rothman | WO | WO-03030434 | 4/2003 |
| 2006/0165005 A1 | 7/2006 | Frank et al. | WO | WO-03073688 | 9/2003 |
| 2006/0168664 A1 | 7/2006 | Frank et al. | WO | WO-03107585 | 12/2003 |
| 2006/0206618 A1 | 9/2006 | Zimmer et al. | WO | WO-03107588 | 12/2003 |
| 2006/0213997 A1 | 9/2006 | Frank et al. | WO | WO-2004092886 | 10/2004 |
| 2006/0282319 A1 | 12/2006 | Maggio | WO | WO-2007032974 | 3/2007 |
| 2006/0282899 A1 | 12/2006 | Raciborski | | | |
| 2007/0033102 A1 | 2/2007 | Frank et al. | | | |
| 2007/0280422 A1 | 12/2007 | Setala | | | |
| 2009/0070454 A1* | 3/2009 | McKinnon et al. .......... 709/224 | | | |
| 2012/0137127 A1 | 5/2012 | Jain | | | |

FOREIGN PATENT DOCUMENTS

| | | |
|---|---|---|
| EP | 0635790 | 1/1995 |
| EP | 0843449 | 5/1998 |
| EP | 1061465 | 12/2000 |
| EP | 1085396 | 3/2001 |
| EP | 1387237 | 2/2004 |
| EP | 1429224 | 6/2004 |
| EP | 1223722 | 8/2004 |
| EP | 1460514 | 9/2004 |
| EP | 1233337 | 8/2005 |
| GB | 2359969 | 9/2001 |
| GB | 2378780 | 2/2003 |
| JP | H0535461 | 2/1993 |
| JP | H0635718 | 2/1994 |
| JP | H07036559 | 2/1995 |

OTHER PUBLICATIONS

"Achieving Peak Performance: Insights from a Global Survey on Credit Risk and Collections Practices," *CGI Group Pamphlet*, pp. 1-11 (2002, 2004).

"Equifax Business Solutions—Manage Your Customers," three pages printed from http://www.equifax.com/sitepages/biz/smallbiz/?sitepage=managecustomers on Oct. 14, 2005.

"Prequalification Using Credit Reports," two pages printed from http://www.credco.com/creditreports/prequalification.htm on Oct. 14, 2005.

Written Opinion for PCT/US2006/034622 mailed Jan. 16, 2007.

International Search Report for PCT/US2006/034622 mailed Jan. 16, 2007.

"Notice of Rejection mailed Jul. 5, 2011", Japanese Application No. 2007-541363, 10 pages.

"Notice of Rejection mailed Aug. 5, 2011", Japanese Patent Application No. 2007-552142, 8 pages.

"Final Office Action mailed Feb. 7, 2011", U.S. Appl. No. 11/152,214, 15 pages.

"Non-Final OA Mailed Aug. 30, 2010", U.S. Appl. No. 11/152,214, 12 pages.
"International Search Report and Written Opinion mailed Jan. 16, 2006", Application Serial No. PCT/US2006/034622, 6 pages.
"Final Office Action mailed May 11, 2010", U.S. Appl. No. 11/152,214, 23 pages.
"Non-Final Office Action mailed Jul. 30, 2009", U.S. Appl. No. 11/152,214, 17 pages.
"Final Office Action mailed Nov. 18, 2008", U.S. Appl. No. 11/152,214, 16 pages.
"Non-Final Office Action mailed Apr. 15, 2008", U.S. Appl. No. 11/152,214, 14 pages.
"Non-Final Office Action mailed Mar. 17, 2011", U.S. Appl. No. 11/022,493, 11 pages.
"Final Office Action mailed Jun. 18, 2010", U.S. Appl. No. 11/022,493, 13 pages.
"Non-Final Office Action mailed May 27, 2009", U.S. Appl. No. 11/022,493, 13 pages.
"Advisory Action mailed Sep. 10, 2008", U.S. Appl. No. 11/022,493, 2 pages.
"Final Office Action mailed Jun. 11, 2008", U.S. Appl. No. 11/022,493, 12 pages.
"Advisory Action mailed Jul. 12, 2007", U.S. Appl. No. 11/022,493, 3 pages.
"Final Office Action mailed Mar. 30, 2007", U.S. Appl. No. 11/022,493, 9 pages.
"International Search Report and Written Opinion mailed Nov. 30, 2006", Application Serial No. PCT/US05/40950, 8 pages.
"Non-Final Office Action mailed Oct. 5, 2006", U.S. Appl. No. 11/022,493, 11 pages.
"Advisory Action mailed Jan. 31, 2011", U.S. Appl. No. 11/006,837, 3 pages.
"Final Office Action mailed Nov. 18, 2010", U.S. Appl. No. 11/006,837, 22 pages.
"Non-Final Office Action mailed May 12, 2010", U.S. Appl. No. 11/006,837, 27 pages.
"Advisory Action mailed Mar. 1, 2010", U.S. Appl. No. 11/006,837, 3 pages.
"Final Office Action mailed Nov. 10, 2009", U.S. Appl. No. 11/006,837, 24 pages.
"Non-Final Office Action mailed Apr. 10, 2009", U.S. Appl. No. 11/006,837, 18 pages.
"Notice of Allowance mailed Jun. 18, 2009", U.S. Appl. No. 10/989,122, 14 pages.
"Non-Final Office Action mailed Feb. 4, 2009", U.S. Appl. No. 10/989,122, 13 pages.
"Non-Final Office Action mailed Aug. 6, 2008", U.S. Appl. No. 10/989,122, 12 pages.
"Non-Final Office Action mailed Jan. 16, 2008", U.S. Appl. No. 10/989,122, 10 pages.
"Final Office Action mailed Mar. 28, 2007", U.S. Appl. No. 10/989,122, 22 pages.
Qiao, Daji et al., "MiSer: An Optimal Low-Energy Transmission Strategy for IEEE 802.11 a/h", obtained from ACM, (Sep. 2003),pp. 161-175.
"Non-Final Office Action mailed Aug. 24, 2006", U.S. Appl. No. 10/989,122, 20 pages.
"International Search Report and Written Opinion mailed Apr. 22, 2008", Application No. PCT/US2007/087960, 7 pages.
Eren, H. et al., "Fringe-Effect Capacitive Proximity Sensors for Tamper Proof Enclosures", *Proceedings of 2005 Sensors for Industry Conference*, (Feb. 2005),pp. 22-25.
"International Search Report and Written Opinion mailed Nov. 15, 2004", Application No. PCT/US05/40966, 9 pages.
Schneier, B. "Applied Cryptography, Second Edition: Protocols, Algorithms, and Source Code in C (cloth)", (Jan. 1, 1996),13 pages.
Goering, Richard "Web Venture Offers Metered Access to EDA Packages—Startup Winds Clocks By the Hour Tools (E*CAD Will Launch Web Site That Provides Pay-Per-Use and Pay-Per-Hour Access to Range of Chip Design Software)", *Electronic Engineering Times*, (Nov. 6, 2000),3 pages.

Zemao, Chen et al., "A Malicious Code Immune Model Based on Program Encryption", *IEEE—Wireless Communication, Networking and Mobile Computing*, WICOM '08, 4th International Conference on Oct. 12-14, 2008,5 pages.
Mufti, Dr. Muid et al., "Design and Implementation of a Secure Mobile IP Protocol", *Networking and Communication, INCC 204*, International Conference on Jun. 11-13, 2004,5 pages.
Davida, George I., et al., "UNIX Guardians: Active User Intervention in Data Protection", *Aerospace Computer Security Applications Conference*, Fourth Dec. 12-16, 1988,6 pages.
Gao, Jerry et al., "Online Advertising—Taxonomy and Engineering Perspectives", http://www.engr.sjsu.edu/gaojerry/report/OnlineAdvertising%20.pdf, (2002),33 pages.
Oshiba, Takashi et al., "Personalized Advertisement—Duration Control for Streaming Delivery", *ACM Multimedia*, (2002),8 pages.
Yue, Wei T., et al., "The Reward Based Online Shopping Community", *Routledge*, vol. 10, No. 4, (Oct. 1, 2000),2 pages.
"International Search Report and Written Opinion mailed Nov. 8, 2007", Application No. PCT/US05/40967, 5 pages.
Lampson, Butler et al., "Authentication in Distributed Systems: Theory and Practice", *ACM Transactions on Computer Systems*, v10, 265,(1992),18 pages.
"DMOD WorkSpace OEM Unique Features", www.dmod.com/oem_features, Retrieved from the Internet on Jan. 12, 2005,3 pages.
"Notice of Rejection mailed Jun. 7, 2011", Japanese Application No. 2007-541361, 3 pages.
"Office Action mailed Jun. 29, 2009", Mexican Application No. MX/a/2007/005657, 2 pages.
"Search Report Dated Jan. 11, 2008", EP Application No. 05820090.8, 7 pages.
"Examination Report mailed Mar. 5, 2008", EP Application No. 05820090.8, 1 page.
"First Office Action mailed Apr. 11, 2008", Chinese Application No. 200580038813.9, 11 pages.
"Office Action mailed Jun. 29, 2009", Mexican Application No. MX/a/2007/005656, 6 pages.
"Office Action mailed Nov. 30, 2009", Mexican Application No. MX/a/2007/005659, 6 pages.
"Notice of Allowance mailed Jul. 2, 2010", Mexican Application No. MX/a/2007/005659, 2 pages.
"Second Office Action mailed Dec. 18, 2009", Chinese Application No. 200580038812.4, 24 pages.
"Third Office Action mailed Apr. 1, 2010", Chinese Application No. 200580038812.4, 9 pages.
"Notice on Grant of Patent Right for Invention mailed May 5, 2011", Chinese Application No. 200580038812.4, 4 pages.
"Office Action mailed Jul. 7, 2009", Mexican Application No. MX/a/2007/005660, 8 pages.
"Notice of Allowance mailed Feb. 18, 2010", Mexican Application No. MX/a/2007/005660, 2 pages.
"Extended European Search Report mailed Aug. 13, 2010", EP Application No. 05823253.9, 7 pages.
"Notice on the First Office Action mailed Sep. 27, 2010", Chinese Application No. 200580038745.6, 6 pages.
"Office Action mailed Jul. 8, 2009", Mexican Application No. MX/a/2007/005662, 7 pages.
"Notice of Allowance mailed Feb. 19, 2010", Mexican Application No. MX/a/2007/005662, 2 pages.
"Partial Search Report mailed Jul. 23, 2010", EP Application No. 05821183.0.
"Extended European Search Report mailed Jan. 7, 2011", EP Application No. 05821183.0, 9 pages.
"Notice of Allowance mailed Dec. 25, 2009", Chinese Application No. 200580038773.8, 4 pages.
"Office Action mailed Jun. 26, 2009", Mexican Application No. MX/a/2007/005655, 5 pages.
"Office Action mailed Feb. 9, 2010", Mexican Application No. MX/a/2007/005855, 6 pages.
"Office Action mailed Sep. 24, 2010", Mexican Application No. MX/a/2007/005655, 3 pages.
"Extended European Search Report mailed Jan. 21, 2010", EP Application No. 05819896.1, 8 pages.

"Office Action mailed Mar. 19, 2010", EP Application No. 05819896.1, 1 page.
"Office Action mailed Feb. 10, 2010", Mexican Application No. MX/a/2007/005656, 5 pages.
"Office Action mailed Oct. 18, 2010", Mexican Application No. MX/a/2007/005656, 3 pages.
"Office Action mailed May 22, 2009", Chinese Application No. 200580038771.9, 5 pages.
"Notice on the First Office Action mailed Jul. 30, 2010", Chinese Application No. 200680033207.2, 7 pages.
"EP Search Report mailed Jan. 2, 2008", EP Application No. 05109616.2, 7 pages.
"Flonix: USB Desktop OS Solutions Provider, http://www.flonix.com", Retrieved from the Internet Jun. 1, 2005, (Copyright 2004),2 pages.
"Migo by PowerHouse Technologies Group, http://www.4migo.com", Retrieved from the Internet Jun. 1, 2005, (Copyright 2003),3 pages.
"WebServUSB, http://www.webservusb.com", Retrieved from the Internet Jun. 1, 2005, (Copyright 2004), 16 pages.
"International Search Report and Written Opinion", Application Serial No. PCT/US05/40940, 18 pages.
"International Search Report and Written Opinion mailed Apr. 25, 2007", Application No. PCT/US05/040965, 5 pages.
"International Search Report and Written Opinion mailed Sep. 25, 2006", Application No. PCT/US05/40949, 7 pages.
"EP Office Action Mailed Nov. 17, 2006", Application No. 05110697.9, 6 pages.
"EP Office Action mailed Apr. 5, 2007", Application No. 05110697.9, 5 pages.
"EP Summons to Attend Oral Proceedings mailed Sep. 27, 2007", Application No. 05110697.9, 7 pages.
"Decision to Refuse a European Application mailed Feb. 15, 2008", Application No. 05110697.9, 45 pages.
"International Search Report and Written Opinion mailed Sep. 8, 2006", Application No. PCT/US05/40942, 20 pages.
"European Search Report mailed Dec. 6, 2010", Application No. EP/05820177, 8 pages.
U.S. Appl. No. 11/018,095, Including O/As dated Mar. 15, 2010; Jul. 8, 2010; Dec. 27, 2010; Jun. 9, 2011; and Sep. 27, 2011.
U.S. Appl. No. 10/988,907, Including O/A dated Dec. 12, 2011.
U.S. Appl. No. 11/022,493, Including NOA dated Dec. 29, 2011.
U.S. Appl. No. 11/018,095, Including NOA dated Dec. 30 2011.
"Extended European Search Report mailed Dec. 6, 2010", EP Application No. 05820177.3, 8 pages.
"Forward Solutions Unveils Industry's Most Advanced Portable Personal Computing System on USB Flash Memory Device", Proquest, PR Newswire, http://proquest.umi.com/pqdweb?index=20&did=408811931&SrchMode=1&sid= 6&Fmt=3, Retreived from the Internet Feb. 15, 2008,(Sep. 22, 2003),3 pages.
"Office Action mailed May 26, 2008", EP Application No. 05109616.2, 5 pages.
"Notice on Division of Application mailed Aug. 8, 2008", CN Application No. 200510113398.0, (Aug. 8, 2008),2 pages.
"Notice on First Office Action mailed Dec. 12, 2008", CN Application No. 200510113398.0.
"The Second Office Action mailed Jul. 3, 2009", CN Application No. 200510113398.0, 7 pages.
"Notice on Proceeding with the Registration Formalities mailed Oct. 23, 2009", CN Application No. 200510113398.0, 4 pages.
"Examiner's First Report on Application mailed Jun. 4, 2010", AU Application No. 2005222507, 2 pages.
"Notice of Acceptance mailed Oct. 14, 2010", AU Application No. 2005222507, 3 pages.
"Decision on Grant of a Patent for Invention mailed Apr. 29, 2010", Russian.Application No. 2005131911, 31 pages.
"Notice of Allowance mailed Nov. 13, 2009", MX Application No. PA/a/2005/011088, 2 pages.
"TCG Specification Architecture Overview", Revision 1.2, (Apr. 28, 2004),55 pages.
"International Search Report and Written Opinion mailed Jun. 19, 2007", PCT Application No. PCT/US05/46091, 11 pages.

"Notice on Grant of Patent Right for Invention mailed Jan. 29, 2010", CN Application No. 200580040764.2, 4 pages.
"Cyotec—CyoLicence", printed from www.cyotec.com/products/cyoicence on Sep. 7, 2005, (Copyright 2003-2005).
"Magic Desktop Automation Suite for the Small and Mid-Sized Business", printed from www.remedy.com/soultions/magic it suite.htm on Sep. 7, 2005, (Copyright 2005), 4 pages.
"Pace Anti-Piracy Introduction", printed from www.paceap.com/psintro.html on Sep. 7, 2005, (Copyright 2002), 4 pages.
"Office Action mailed Jul. 6, 2009", MX Application No. MX/a/2007/005661, 6 pages.
"Office Action mailed Oct. 1, 2010", MX Application No. MX/a/2007/005661, 3 pages.
"Office Action mailed Mar. 8, 2011", MX Application No. MX/a/2007/005661, 8 pages.
"Notice on Second Office Action mailed Jun. 7, 2010", CN Application No. 200680030846.3, 6 pages.
"Decision on Rejection mailed Sep. 13, 2010", CN Application No. 200680030846.3, 5 pages.
Kwok, Sai H., "Digital Rights Management for the Online Music Business", ACM SlGecom Exhchanges, vol. 3, No. 3, (Aug. 2002), pp. 17-24.
"International Search Report and Written Opinion mailed Mar. 21, 2007", Application No. PCT/US05/46223, 10 pages.
"The First Office Action mailed Oct. 9, 2009", CN Application No. 200580043102.0, 20 pages.
"Notice of Rejection mailed Jun. 13, 2011", JP Application No. 2007-551270, 4 pages.
"International Search Report and Written Opinion mailed Jul. 9, 2008", Application No. PCT/US05/46539, 11 pages.
"Notice of the First Office Action mailed Dec. 29, 2010", CN Application No. 200580044294.7, 9 pages.
"Office Action mailed Jul. 1, 2009", MX Application No. 2007/a/2007/007441.
"European Search Report mailed Aug. 31, 2011", EP Application No. 05855148.2, 6 pages.
"International Search Report and Written Opinion mailed Sep. 25, 2007", Application No. PCT/US06/12811, 10 pages.
"Examiner's First Report mailed Sep. 15, 2009", AU Application No. 2006220489, 2 pages.
"Notice of Acceptance mailed Jan. 25, 2010", AU Application No. 2006220489, 2 pages.
"The First Office Action mailed Aug. 22, 2008", CN Application No. 200680006199.2, 23 pages.
"The Second Office Action mailed Feb. 20, 2009", CN Application No. 200680006199.2, 9 pages.
"The Fourth Office Action mailed Jan. 8, 2010", CN Application No. 200680006199.2, 10 pages.
"The Fifth Office Action mailed Jul. 14, 2010", CN Application No. 200680006199.2, 6 pages.
"Notice on Grant of Patent mailed Oct. 20, 2010", CN Application No.200680006199.2, 4 pages.
"First Office Action mailed Aug. 21, 2009", CN Application No. 200680030846.3, 8 pages.
"Notice of Rejection mailed Jul. 12, 2011", JP Application No. 2007-541351, 4 pages.
"Notice of Rejection mailed Jul. 22, 2011", JP Application No. 2007-541362.
"Notice of Rejection mailed Jul. 15, 2011", JP Application No. 2007-541356, 4 pages.
"Notice of Rejection mailed Jul. 26, 2011", JP Application No. 2007-541352, 5 pages.
"Notice of Rejection mailed Jul. 22, 2011", JP Application No. 2007-541355, 4 pages.
"Notice on the First Office Action mailed Dec. 11, 2009", CN Application No. 200510127170.7, 16 pages.
"Notice of Rejection mailed Jun. 21, 2011", JP Application No. 2005-330496, 6 pages.
"The Third Office Action mailed Jun. 5, 2009", CN Application No. 200680006199.2, 7 pages.
"Notice of Rejection mailed Sep. 9, 2011", JP Application No. 2007-548385, 9 pages.

"Notice of Rejection mailed Nov. 11, 2011", Japanese Application No. 2005-301957, 21 pages.

Utagawa, Mari et al., "Creation of Card Application by IC Card OS 'Multos' Which Can Rewrite Application", Interface, vol. 29, No. 3, ISSN: 0387-9569, CQ Publishing Co. Ltd., (Mar. 1, 2003), pp. 46-55.

"Extended European Search Report mailed Dec. 21, 2011", EP Application No.05854752.2, 7 pages.

"Office Action mailed Dec. 7, 2011", JP Application No. 2008-528054, 7 pages.

"Final Rejection mailed Jan. 17, 2012", Japan Application No. 2007-552142, 8 pages.

"EP Office Action mailed Mar. 8, 2012", EP Application No. 05109616.2, 6 pages.

"Office Action mailed Jun. 8, 2012", Japanese Application No. 2005-301957, 8 pages.

Nakajima, S.; "Do You Really Know It? Basics of Windows2000/XP, Network, 4th Installment, What Is Logon Like?," Nikkei Windows for IT professionals, Jan. 2004 (No. 82), pp. 116-121, Nikkei Business Publications, Inc., Jan. 1, 2004, ISSN: 1346-8308.

"First Special Feature, Security-oriented Web Application Development, Part 3, Method for Realizing Secure Session Management," N+I Network Guide, Jan. 2004 (vol. 4, No. 1, Serial No. 32), pp. 47-59, Softbank Publishing Inc., Jan. 1, 2004.

U.S. Appl. No. 11/612,436, Including Notice of Allowance mailed Mar. 1, 2011 and OA dated Sep. 17, 2010.

U.S. Appl. No. 13/367,198, Including any future O/As.

"Notice of Preliminary Rejection mailed May 30, 2012", Korean Patent Application No. 10-2007-7011069, 1 page.

Mois, Dan et al., "Reconfiguration Securityfor Hardware Agents in Testing", Automation Quality and Testing Robotics (AQTR), 2010 IEEE International Conference on Volume: 2, (2010), pp. 1-5.

Zhang, Kai et al., "Reconfigurable Security Protection FPGA and Embedded Soft-Core Technology", Computer Design and Applications (ICCDA), 2010 International Conference on Volume, (2010), pp. V5-540-V5-544.

Ooi, Joo G., et al., "A Proof of Concept on Defending Cold Boot Attack", Quality Electronic Design, ASQED 2009, 1st Asia Symposium, (2009), pp. 330-335.

"Office Action mailed Jul. 4, 2012", Korean Application No. 10-2007-7012294, 2 pages.

Extended European Search Report; EP Application No. 05851550.3 of Jul. 5, 2012; 6 pages.

\* cited by examiner

TUNING PRODUCT POLICY USING OBSERVED EVIDENCE OF CUSTOMER BEHAVIOR

This application is a continuation-in-part of U.S. patent application Ser. No. 11/152,214, filed Jun. 14, 2005, which is a continuation-in-part of U.S. patent application Ser. No. 11/022,493, filed Dec. 22, 2004, which is a continuation-in-part of U.S. patent application Ser. No. 11/006,837, filed Dec. 8, 2004, which is a continuation-in-part of U.S. patent application Ser. No. 10/989,122, filed Nov. 15, 2004.

BACKGROUND

Systems for managing financial risk have taken many forms. Credit card companies routinely monitor transactions watching for fraudulent behavior. Credit limits are based on past performance with respect to spending and bill payment. Individuals and companies with good credit histories may be afforded higher credit limits and more lenient policies with respect to use of a credit line. In many of these cases, each transaction is analyzed and approved on a transaction by transaction basis. Further, in many instances the actual financial instrument is relatively inexpensive, for example, a plastic credit card may cost less than a dime. In other instances, for example, a cellular telephone system, the cellular phone may have some value but may be rendered essentially useless when access to the network is denied.

However, in the case of a pay-per-use or pay-as-you-go computer, the asset, that is the computer, has high value and may offer valuable functionality even when disconnected from a network. Analyzing, measuring, and controlling risk on such a platform presents unique challenges to risk management.

SUMMARY

Data related to operation of a pay-per-use or pay-as-you-go computer may be gathered from the computer itself and from data related to financial transactions and other credit-related information. Using this information, policies may be developed specifying how closely to monitor operation of the computer for fraudulent activity as well as setting the level of response to suspected fraudulent activity. Monitoring the operation of the computer may involve not only what measurements to take, but how often to take the measurements. Taking too many measurements may affect computer performance and lower user satisfaction with the computing experience. Under-measuring may increase the risk to an underwriter from loss due to fraudulent activity. By setting the policy based on the user's observed behavior, using either data gathered at the computer, financial transaction records, or both, a balance may be achieved.

DETAILED DESCRIPTION OF VARIOUS EMBODIMENTS

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Figure 1:
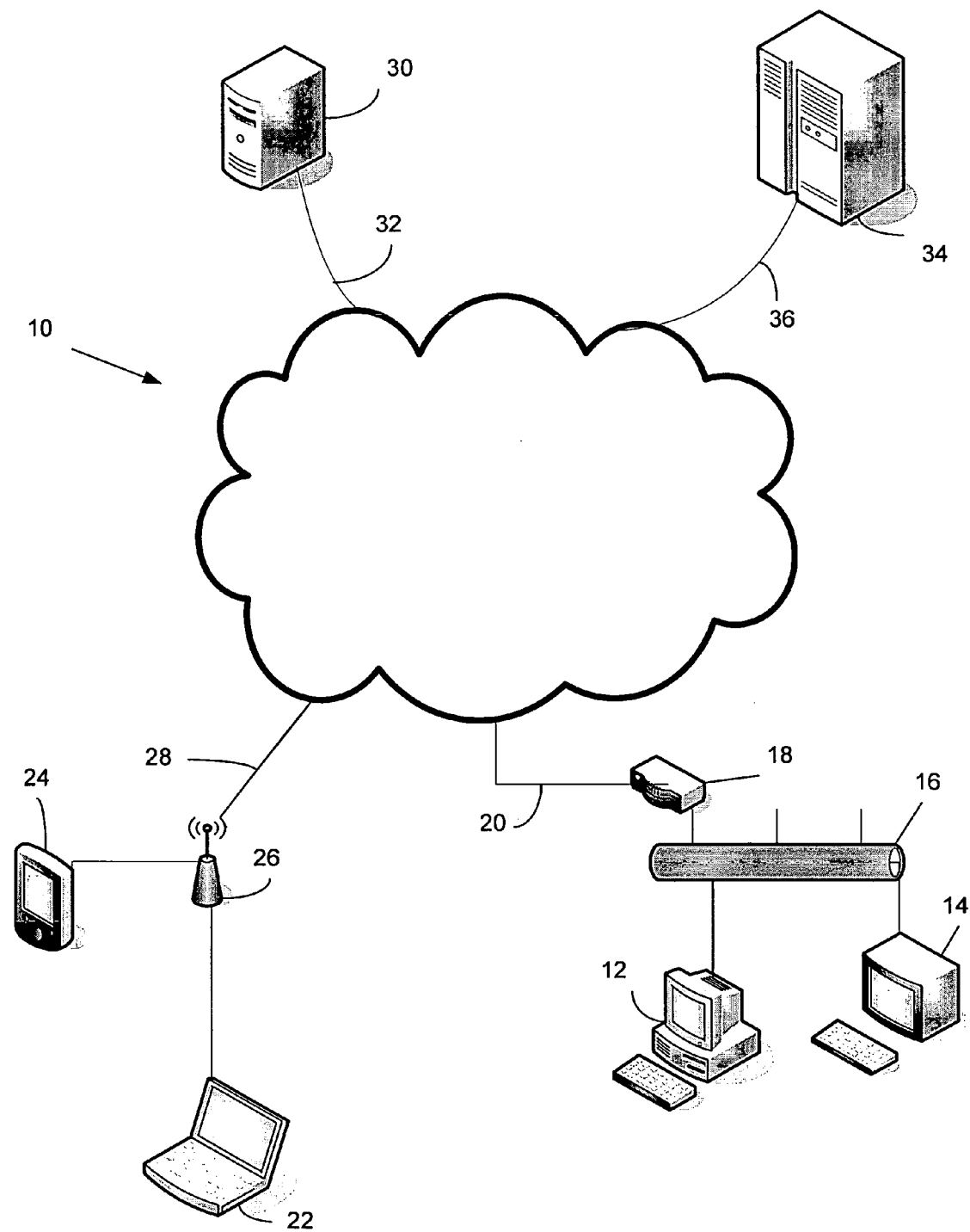
FIG. 1 is a simplified and representative block diagram of a computer network.

FIG. 1 illustrates a network 10 that may be used to implement a pay-per-use computer system. The network 10 may be the Internet, a virtual private network (VPN), or any other network that allows one or more computers, communication devices, databases, etc., to be communicatively connected to each other. The network 10 may be connected to a personal computer 12 and a computer terminal 14 via an Ethernet 16 and a router 18, and a landline 20. On the other hand, the network 10 may be wirelessly connected to a laptop computer 22 and a personal data assistant 24 via a wireless communication station 26 and a wireless link 28. Similarly, a server 30 may be connected to the network 10 using a communication link 32 and a mainframe 34 may be connected to the network 10 using another communication link 36.

In the case of a pay-per-use or pay-as-you-go model, the elements of FIG. 1 may be used to illustrate system components. Metered devices, that is, pay-per-use or pay-as-you-go hardware and/or software, may be represented by personal computer 12, laptop computer 22, personal data assistant 24, or server 30. The mainframe 34, or one or more servers 30 may represent the infrastructure side of the system, for example, clearinghouse functions, payment system functions, or provisioning system functions, etc.

Figure 2:
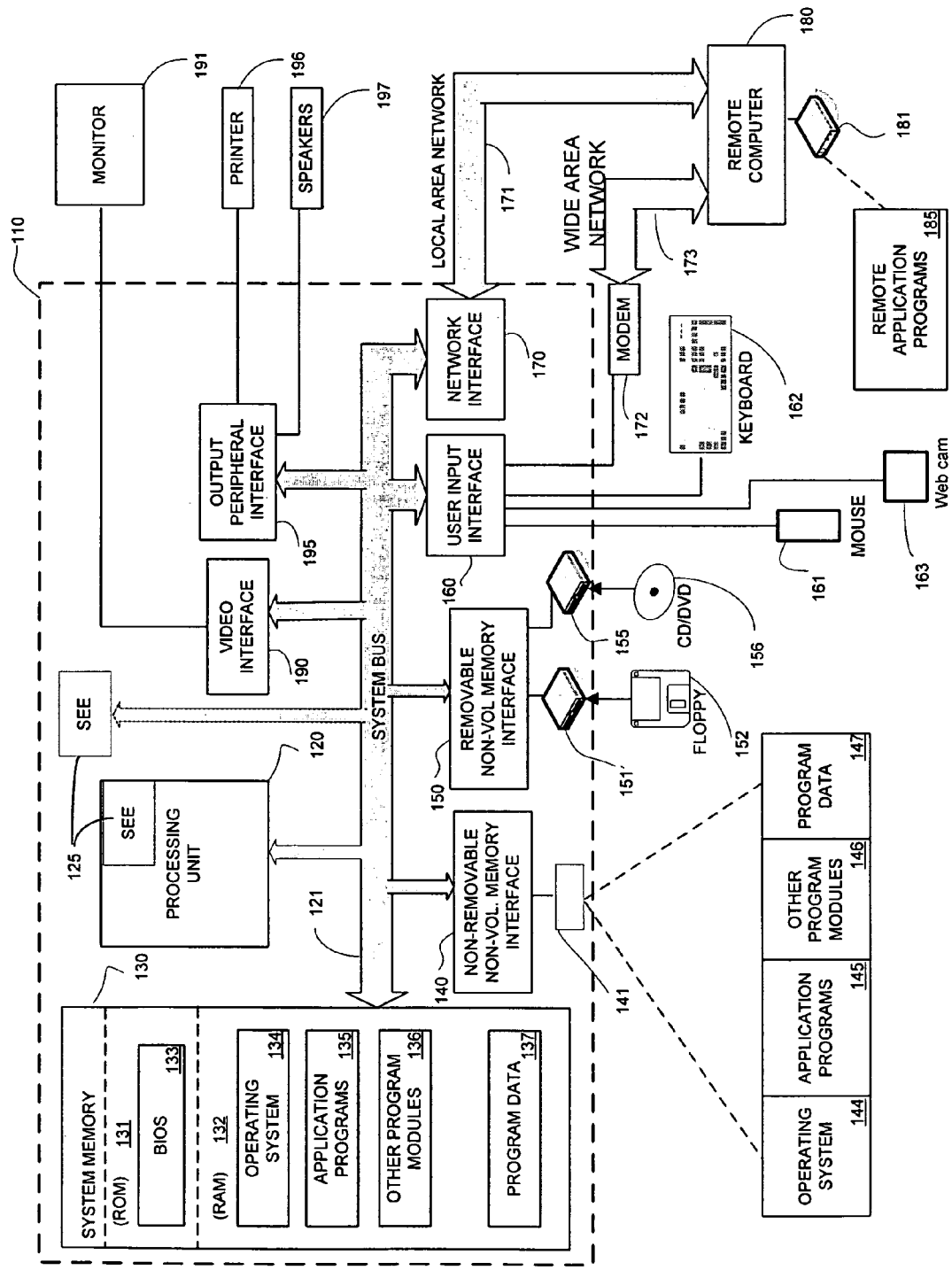
FIG. 2 is a block diagram of a computer that may be connected to the network of FIG. 1.

FIG. 2 illustrates a computing device in the form of a computer 110 that may be connected to the network 10 and used to implement one or more components of the dynamic software provisioning system. Components of the computer 110 may include, but are not limited to, a processing unit 120, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The processing unit 120 may also include a secure execution environment 125. In another embodiment, the secure execution environment 125 may be a standalone component, as shown by the dashed lines of FIG. 2. The secure execution environment 125 and its interaction with the processing unit 120, or equivalent devices, is discussed in more detail below with respect to FIG. 3 and FIG. 4.

The computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computer 110 may also include other removable/non-removable, volatile/nonvolatile computer storage media. By way of example only, FIG. 2 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Another input device may be a camera for sending images over the Internet, known as a web cam 163. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on memory device 181. It will be appreciated that the network connections shown are exemplary and other means of establishing a communications link between the computers may be used.

Figure 3:
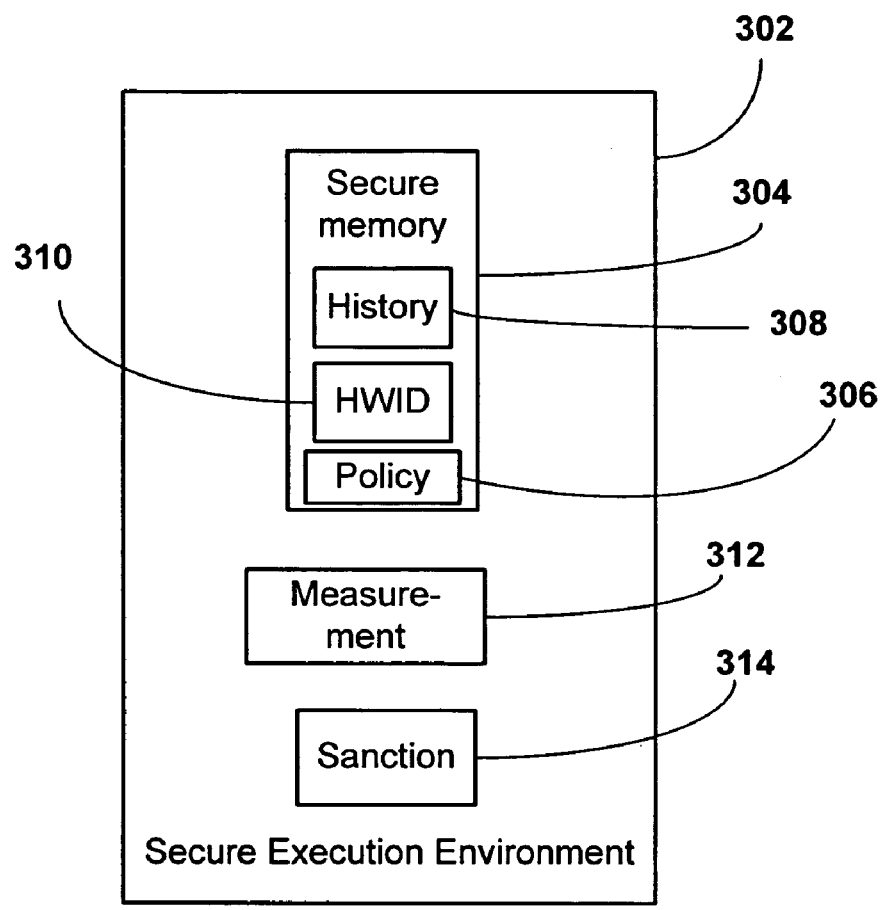
FIG. 3 is a block diagram of a computer showing details of a secure execution environment and its relationship to other functional elements of the computer.

FIG. 3 is a block diagram of a secure execution environment 302, the same as, or similar to, the secure execution environment 125 of FIG. 2. The secure execution environment 302 include a secure memory 304. Secure memory 304 may be used to store data, executable programs, cryptographic keys, or other information in a secure, tamper-resistant manner. Specifically, the secure memory 304 may store policy information 306, history data 308 corresponding to previous measurements and/or sanction activity, and a hardware identifier 310 used to identify the computer 110.

The secure execution environment 302 may include a measurement circuit 312 and a sanction circuit 314. The measurement circuit 312 may be used to gather data about the operation of the computer 110, particularly as it relates to conformance to the policy 306. The sanction circuit 314 may be invoked when it is determined that the computer 110 is not operating in conformance to the policy 306. The nature and severity of sanctions may be determined by the policy 306. The measurement circuit 312 and the sanction circuit 314 may also be implemented in software and executed by the processing unit 120.

Figure 4:
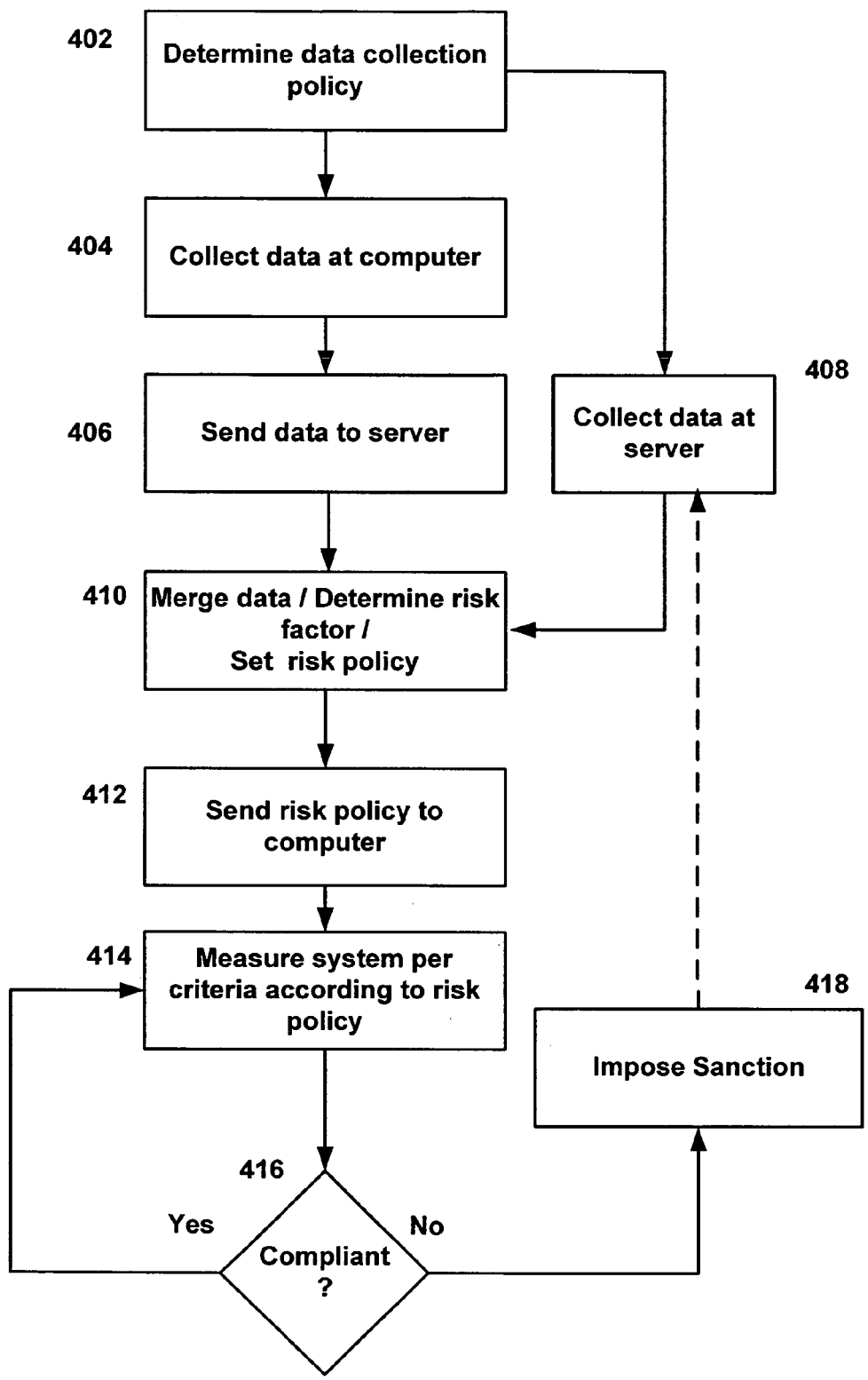
FIG. 4 a flow chart depicting a method of tuning product policy based on observed user behavior.

FIG. 4, a flow chart of a method of tuning product policy, is discussed and described. A data collection policy may be determined at block 402. The data collection policy pertains to those measurements that will be used for tuning the policy and in turn setting operational measurements for measuring compliance to an operating policy. The data collection policy may be a default or a policy initially installed prior to delivery to the end-user.

Measurements may then be taken at block 404 to collect data at the computer according to the data collection policy of block 402. The data collected, for use in determining a risk factor, may include component verification, metering activity, clock verification, previous enforcement action, provisioning packet activity, and application usage. Component verification may include measurements to ensure that certain elements of the computer are present and operating properly, for example peripheral units may be bound to the computer 110 as part of a package. Data collected with respect to metering activity may analyze patterns of metering and duration of metering to determine if they fall within normal or historical usage patterns and if they match other measurements such as application usage. A history of provisioning packet receipt may also be used to determine risk. For example, application usage should not greatly exceed metering, nor should metering greatly exceed value corresponding to provisioning packet downloads.

The collected data may be analyzed locally and results sent to a server, such as server 30 of FIG. 1, at block 406. Alternatively, the raw data may be sent to a server at block 406 with the analysis done at the server.

The data collection policy at block 402 may also specify data to be collected by the server 30 at block 408. Data collected at the server may include commercially available credit data, local data corresponding to payment history, history data about previous sanctions, customer service data such as contact with a support center, and the like.

The data collected both at the computer 110 and at the server may be merged, if both are used, at block 410 and further analyzed to determine a risk factor. The risk factor may then be used to set a risk policy. In one embodiment, the risk factor directly corresponds to a policy, while in another embodiment the risk factor may be used to select from pre-determined policies. The policy, or a policy identifier, may be sent to the computer 110 at block 412. The policy may be coded as an XML schema. The policy may be signed or signed and encrypted so that fraudulent policies are not accepted by the computer 110.

In one embodiment, the risk factor or related data may be programmatically exposed, for example, using an application program interface, for sharing with other entities. In some target markets, the risk factor or related data may be the only financial history or record of responsibility available for a user. The risk factor generated by use of the computer 110 may be a valuable first step in developing a recognition of fiscal responsibility and provide a standardized way of quantifying such information. Making such data available, especially programmatically, may be a valuable side effect of the measurements and calculation of risk factor.

When the policy has been verified and installed the computer 110 may resume operation using the updated policy. As discussed above, the policy may include setting criteria for measuring compliance with the policy and may include collection of data corresponding to a periodic signal from the operating system, e.g. an operating system heartbeat. The operating system heartbeat may be a regular signal, in some embodiments, a signed signal, indicating that an approved, valid version of the operating system is running. Other measurements may include some of those taken previously, as well as others, depending on the policy, such as verification of designated files or components, monitoring a system clock for tampering, verification of standard operating modes, frequency and type of memory access, and continued comparison of time between provisioning cycles and metered usage. Measurements may be taken and data stored by the secure execution environment 125.

The measurement data may be analyzed to determine compliance with the policy at block 416. If the measurement data indicates compliance with the policy the yes branch from block 416 may be taken to block 414 and in more measurement data may be collected.

When an analysis of the measurement data at block 416 indicates noncompliance with the policy, the no branch may be taken and a sanction imposed at block 418. Depending on the settings of the policy, a range of sanctions may be imposed, as discussed above, ranging from a warning to disabling the computer 110.

Although the forgoing text sets forth a detailed description of numerous different embodiments of the invention, it should be understood that the scope of the invention is defined by the words of the claims set forth at the end of this patent. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

We claim:

1. A method of determining and enforcing a risk policy on a pay-per-use device, the method comprising:
   collecting and storing operational data at the pay-per-use device, wherein the operational data indicates a metered measurement of usage by a user of the pay-per-use device based on user input by the user to the pay-per-use device, wherein the pay-per-use device includes a processor, memory, and an input and/or output device, and the processor of the pay-per-use device is configured to collect and store the operational data and to perform a local analysis of the operational data;
   collecting and storing user financial data reflecting at least one of payment history or credit data associated with the user;
   determining a risk factor based on the operational data and the user financial data, the risk factor being associated with the user;
   setting the risk policy based on the determined risk factor, the risk policy being determined from a plurality of available risk policies, the risk policy including measurement criteria for collecting measurement data by the pay-per-use device to assess compliance with the risk policy when monitoring subsequent activity at the pay-per-use device, wherein the risk policy includes sanctions for non-compliance with the risk policy; and
   collecting the measurement data during the subsequent activity at the pay-per-use device to determine compliance with the risk policy, wherein the collecting of the measurement data is performed according to the measurement criteria, and the collecting of the measurement data is accomplished at a tamper resistant secure component using the processor of the pay-per-use device to determine compliance with the risk policy,
   wherein the measurement criteria for collecting the measurement data at the pay-per-use device are based on both the operational data collected at the pay-per-use device and the user financial data.

2. The method of claim 1, further comprising:
   analyzing the measurement data at the tamper resistant secure component to determine compliance with the risk policy; and
   imposing one or more of the sanctions on the pay-per-use device when the tamper resistant secure component determines non-compliance with the risk policy.

3. The method of claim 1, wherein the user financial data is collected at a server separate from the pay-per-use device.

4. The method of claim 1, wherein collecting the data comprises collecting the operational data at the pay-per-use device and reporting the operational data to a server separate from the pay-per-use device.

5. The method of claim 1, wherein the financial data reflects the payment history including at least a frequency of payments by the user.

6. The method of claim 1, wherein the operational data reflects at least one of a component verification, a clock verification, a previous enforcement action, a provisioning packet activity, and an application usage.

7. The method of claim 6, further comprising programmatically exposing the risk factor for use by an external entity.

8. The method of claim 1, wherein the measurement criteria specify that the measurement data includes at least one of an operating system heartbeat, a verification of designated files, a verification of a system clock, an operating mode, a frequency of memory access, or a time between provisioning cycles.

9. The method of claim 1, wherein the measurement criteria specify that the measurement data includes:
   an operating system heartbeat,
   a verification of designated files,
   a verification of a system clock,
   an operating mode,
   a frequency of memory access, and
   a time between provisioning cycles.

10. The method of claim 1, wherein the measurement criteria specify how often the measurement data are collected at the pay-per-use device.

11. The method according to claim 1, wherein the measurement criteria specify particular measurements that are taken at the pay-per-use device to collect the measurement data.

12. The method according to claim 1, wherein the plurality of available risk policies include different measurement criteria that are associated with different payment histories than the payment history associated with the user.

13. The method according to claim 1, wherein the plurality of available risk policies include different measurement criteria that are associated with different credit data than the credit data associated with the user.

14. The method according to claim 1, the risk factor being further based on customer service data reflecting previous contact by the user with a support center.

15. The method according to claim 1, wherein the measurement criteria specify an operating system heartbeat comprising a signed signal indicating that an approved, valid version of an operating system is executing on the pay-per-use device.

16. The method according to claim 1, wherein setting the risk policy comprises replacing another risk policy that is installed on the pay-per-use device prior to delivery of the pay-per-use device to the user.

17. The method according to claim 1 wherein the measurement data identify whether a peripheral unit of the pay-per-use device is present and operating properly.

18. The method according to claim 1, wherein the tamper resistant secure component comprises a secure memory.

19. The method according to claim 1, wherein collecting the measurement data further comprises analyzing whether the measurement data fall within normal or historical usage patterns.

20. The method according to claim 19, further comprising sending the measurement data to a server that analyzes whether the measurement data fall within normal or historical usage patterns.

* * * * *